United States Patent

[11] 3,614,625

| | | |
|---|---|---|
| [72] | Inventor | Albert T. Mayle, Jr.<br>Newhall, Calif. |
| [21] | Appl. No. | 679,108 |
| [22] | Filed | Oct. 30, 1967 |
| [45] | Patented | Oct. 19, 1971 |
| [73] | Assignee | International Telephone and Telegraph Corporation<br>New York, N.Y. |

[54] MASTER-SLAVE, TUNED CHANNELS FOR SIMULTANEOUS TRACKING OF PLURAL SIGNALS OF DIFFERENT FREQUENCIES
11 Claims, 1 Drawing Fig.

[52] U.S. Cl. ........................................................... 325/307,
325/303, 343/176
[51] Int. Cl. .................................................. H04b 1/06
[50] Field of Search ............................................. 325/301,
302, 306, 303, 307, 363, 50, 67, 419, 421, 51,
56, 60, 369; 343/7, 175, 7.4, 179, 205, 206,
176; 318/314, 318, 20.132

[56] References Cited
UNITED STATES PATENTS

| 3,102,167 | 8/1963 | Barton.......................... | 343/176 X |
| 3,230,453 | 1/1966 | Boor et al. ..................... | 325/307 X |
| 3,289,084 | 11/1966 | Adams .......................... | 343/179 X |
| 3,308,380 | 3/1967 | Graves et al. .................. | 325/303 X |
| 3,383,599 | 5/1968 | Miyagi........................... | 325/307 X |

*Primary Examiner*—Robert L. Griffin
*Assistant Examiner*—R. S. Bell
*Attorneys*—C. Cornell Remsen, Jr., Rayson P. Morris, Percy P. Lantzy, Paul W. Hemminger and A. Donald Stolzy

ABSTRACT: Receiver apparatus for receiving and locking to a pair of harmonically related RF signals, including a pair of phase-lock loops for the respective RF channels and a primary acquisition circuit for each of the phase-lock loops. Switching means is responsive to primary acquisition in either channel to slave the unlocked loop in the other channel to the locked loop in a secondary acquisition so as to automatically adjust the control frequency of the slaving loop to approximately the correct frequency for primary acquisition in said other channel.

PATENTED OCT 19 1971  3,614,625
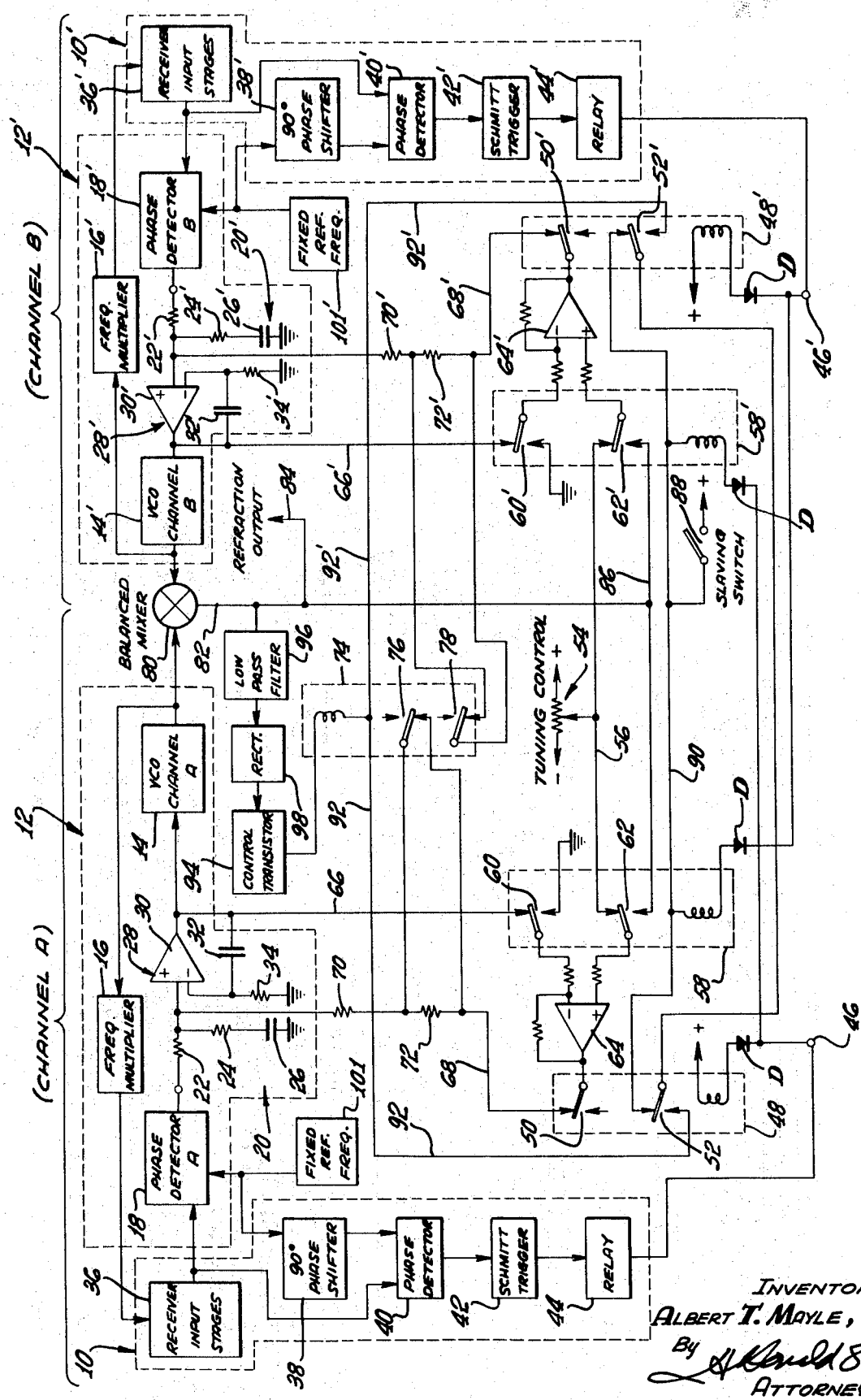
INVENTOR.
ALBERT T. MAYLE, JR.
By
ATTORNEY.

MASTER-SLAVE, TUNED CHANNELS FOR SIMULTANEOUS TRACKING OF PLURAL SIGNALS OF DIFFERENT FREQUENCIES

BACKGROUND OF THE INVENTION

It has been the practice in satellite tracking systems to measure the ionospheric refraction error by employing a pair of widely differing but harmonically related RF signals which are affected differently by ionospheric refraction. Phase-lock loops in the respective channels are arranged to have control frequencies which are generally the same, but which will differ by an amount corresponding to the differing effect of ionospheric refraction on the two channels. By mixing together the control frequencies for the two phase-lock loops, or some multiples thereof, a beat frequency is produced which can be interpreted to determine the ionospheric refraction error.

For example, in the AN/SRN-9 Radio Navigation Receiver, two harmonically related channels of reception are provided on frequencies 150 MHz. and 400 MHz. In the satellite transmitter, both frequencies are derived from a common oscillator, so that the only difference in the received frequencies is due to ionospheric refraction, which produces a maximum frequency difference of less than 6 Hz. when both frequencies are referenced to 150 MHz. Since the two received frequencies are integral multiples of a lower frequency (in this case 50 MHz.), the VCO (Voltage Controlled Oscillator) signals in each of the phase-lock loops are multiplied by factors having the same ratio as the transmitted frequencies to form the local oscillator signals for the two channels. In the receiver example under discussion, these multiples are 8 and 3 for the two channels. The refraction output required in the receiver example is that equivalent to the 150 MHz. channel, so that each VCO frequency is multiplied by 3 before mixing with each other to produce the refraction beat.

In this type of communication system it has been conventional practice to independently tune each of the phase-lock loops of the receiver for acquisition of the respective RF signals. This requires a duplication of operator time and effort, frequently involves considerable signal hunting by the operator, and where one signal comes in sooner than the other, requires operator vigilance until the other signal is acquired. Other deficiencies in the aforesaid conventional separate tuning for acquisition of the two RF channels will become apparent from the following description of the present invention.

SUMMARY OF THE INVENTION

According to the present invention, the two receiver channels are interrelated so that as soon as primary signal acquisition is achieved in either of the two channels the phase-lock loop of the unlocked channel will be automatically slaved to the phase-lock loop of the locked channel. This brings the frequency of the unlocked loop within the refraction difference of the signal which it is to receive. Since this refraction difference is less than the loop bandwidth, the loop will then automatically lock onto the received signal if it is above threshold level. Achievement of the slaving lock status will sometimes hereinafter be referred to as secondary acquisition, as distinguished from primary acquisition which involves locking to an incoming RF signal.

In order that secondary acquisition be rapid and positive, and so that the secondary acquisition status does not interfere with subsequent primary acquisition in the slaving loop at the earliest possible moment, the slaving loop is initially set up with a circuit element arrangement providing high gain and wide bandwidth, but circuit means responds to the secondary acquisition to alter this circuit arrangement so that the gain is greatly reduced in the slave loop to allow the external signal for the slaving channel to dominate over the slaving signal from the other channel, thereby preparing the slaving loop for a primary acquisition.

In one form of the invention which is described hereinafter in detail, each of the two channels includes a phase-lock loop having a respective primary acquisition circuit. Potentiometer tuning control adjusts the frequencies of oscillation of the VCO's in the two loops until primary acquisition occurs for one of the loops. The primary acquisition circuit for the locked loop actuates relay means to disconnect the tuning control from both channels and to establish a secondary or slaving phase-lock loop which includes, among other things, the locked VCO as a reference signal, the unlocked VCO and a phase detector operating between the two VCO signals, this phase detector being in the form of a balanced mixer which is normally used to provide the refraction error signal output of the receiver.

Further relay means responds to the establishment of slaving lock status (secondary acquisition) to alter the circuitry of the slave loop so as to greatly reduce the slave loop gain so that the slaving loop will be readily released in favor of primary acquisition to the external RF signal when it is above threshold level.

The present invention permits achievement of faster signal acquisition, rejection of lock-on to undesired signals, provides more continuous data reception through antenna multipath nulls, and minimizes requirement for operator action.

Other objectives and advantages of the present invention will become apparent from the following description and drawing, wherein:

BRIEF DESCRIPTION OF THE DRAWING

The single FIGURE of the drawing is a circuit diagram showing one form of the invention.

DETAILED DESCRIPTION

Referring to the drawing, primary acquisition circuits for the respective channels are generally designated 10 and 10'. The phase-lock loops for the respective channels are generally designated 12 and 12'.

Referring in more detail to the phase-lock loops 12 and 12', the loop 12 includes VCO 14 having its output connected to a frequency multiplier 16, the output of which is connected to the receiver input stages as an LO signal. The detector 18 drives a passive integrator composed of resistors 22 and 24 and capacitor 26, which in turn drives an active integrator composed of amplifier 30, capacitor 32 and resistor 34. The output of the active integrator 28 drives the control input of the VCO 14.

Phase-lock loop 12' is similarly constituted, including VCO 14' connected to frequency multiplier 16', which in turn provides an LO signal to the receiver input stages. The phase detector 18' drives passive integrator 20' consisting of resistors 22' and 24' and capacitor 26', which in turn drives active integrator 28' composed of amplifier 30', capacitor 32' and resistor 34', the output of active integrator 28' driving the control input of VCO 14'.

The primary acquisition circuit 10 which is associated with phase-lock loop 12 includes receiver input stages generally designated 36 connected to phase detector 18 to provide part of the input thereto. The fixed reference frequency output 101 is connected both to the phase detector 18 and to a 90° phase shifter 38. A phase detector 40 receives its input both from receiver input stages 36 and phase shifter 38. By this arrangement, when the output frequency of the receiver 36 as controlled by the VCO 14 is the same as the reference frequency 101 and in the proper phase, the phase detector 40 will produce a maximum output signal, which will actuate a Schmitt Trigger 42, which in turn energizes a relay 44. This energization of relay 44 then causes the required switching by further relay means to complete primary acquisition of the one channel and to establish slaving in the other channel.

For convenience the channel including the primary acquisition circuit 10 and phase-lock loop 12 will hereinafter sometimes be referred to as channel A, while the channel including primary acquisition circuit 10' and phase-lock loop 12' will sometimes hereinafter be referred to as channel B.

The primary acquisition circuit 10' for channel B is constituted similarly to the primary acquisition circuit for channel A, including receiver input stages 36', 90° phase shifter 38', phase detector 40', Schmitt Trigger 42' and relay 44', these various stages of the primary acquisition circuit 10' being related to phase-lock loop 12' in the same manner that primary acquisition circuit 10 is related to phase-lock loop 12. Thus, when the output frequency of the receiver 36' as controlled by the VCO 14' is the same as the reference frequency 101' and in the proper phase, the phase detector 40' will produce a maximum output signal, actuating Schmitt Trigger 42' and thereby energizing relay 44'.

The output of relay 44 is connected to a terminal 46, which in turn connects with channel A primary acquisition relay 48 having upper contacts 50 and lower contacts 52. Similarly, the output of relay 44' is connected to a terminal 46', which in turn is connected to channel B primary acquisition relay 48' having upper contacts 50' and lower contacts 52'. Energization of relay 44 or 44' causes grounding of the respective terminal 46 or 46' so as to energize the respective primary acquisition relay 48 or 48'.

Primary acquisition is obtained by either manually or automatically moving a tuning potentiometer 54 until primary acquisition is achieved in either channel; i.e., until either relay 44 is energized for primary acquisition in channel A or relay 44' is energized for primary acquisition in channel B. The tuning potentiometer 54 has its movable contact connected to tuning conductor 56 which at one end is connected through channel A slaving relay 58, having contacts 60 and 62, to one of the inputs of a differential amplifier 64. The other end of tuning conductor 56 is connected through channel B slaving relay 58', having contacts 60' and 62', to one of the inputs of a differential amplifier 64'. Before primary acquisition has occurred in either channel, the slaving relays 58 and 58' are unenergized, and the tuning conductor 56 is connected to the respective differential amplifiers 64 and 64' through the lower contacts 62 and 62' of the respective slaving relays 58 and 58'.

The other input to differential amplifier 64 is from the output of amplifier 30, through VCO control voltage conductor 66 and contact 60 of relay 58. Similarly, the other input for differential amplifier 64' is from the output of amplifier 30' through VCO control voltage conductor 66' and contact 60' of relay 58'. In this manner, the differential amplifiers 64 and 64' compare the tuning voltage with the VCO control voltages for the respective channels, and then feed the amplified difference voltage to the active integrator 28 or 28' for the respective channel through contact 50 or 50' of the respective relay 48 or 48', through respective conductor 68 or 68', and through respective resistor 70 or 70'. By this means, the VCO control voltage in each channel will follow the tuning voltage as applied from tuning potentiometer 54 so that the VCO's may be manually tuned to any frequency within their ranges.

It will be noted that resistors 72 and 72' are also included in the respective conductors 68 and 68'. However, these resistors 72 and 72' are normally shunted out by a further relay 74 having upper and lower contacts 76 and 78, respectively. The resistors 72 and 72' are shunted out of the respective lines 68 and 68' by the respective upper and lower contacts 76 and 78 of relay 74.

According to the present invention, as soon as primary acquisition is achieved in either channel, the potentiometer tuning voltage and VCO control voltage applied to the amplifier 64 or 64' in the unlocked channel are replaced by an output voltage from the balanced mixer 80, operating as a phase detector, the mixer 80 being connected to the outputs of the VCO's 14 and 14'. The balanced mixer 80 is normally used to provide the refraction error signal output of the receiver through refraction signal line 82 and refraction output conductor 84. However, to effect slaving in the unlocked channel, the output of balanced mixer 80 is connected through line 82 to a conductor 86, and thence through the contacts 62 or 62' of relay 58 or 58' to the amplifier 64 or 64' of the unlocked channel, which amplifier in this case will function as a regular amplifier and not as a differential amplifier. The output of this amplifier 64 or 64' in the unlocked channel will be conducted through conductors 68 or 68' and resistor 70 or 70' to the passive filter 20 or 20' and the active filter 28 or 28' of the unlocked phase-lock loop in order to slave the unlocked loop to the locked loop.

In order for slaving to thus be established, it is first necessary to close a slaving switch 88 which provides electrical potential to slaving voltage supply line 90 which supplies the necessary voltage for actuation of either of the slaving relays 58 or 58'. Voltage is also supplied from line 90 through the lower contacts 52 or 52' of relay 48 or 48' in the locked channel, and thence through a conductor 92 or 92' to one side of the coil of the relay 74. This provides the necessary electrical potential for actuating relay 74 so as to open the contacts 76 and 78 thereof and thereby place the added resistors 72 and 72' in the respective conductors 68 and 68'. However, such actuation of relay 74 cannot occur until the secondary acquisition has been achieved, i.e., until the two VCO's 14 and 14' have been locked together. Such delay in actuation of relay 74 and consequent insertion of the additional resistors 72 and 72' in the circuit is accomplished by means of a control transistor 94 in the coil circuit of relay 74, the control transistor 94 normally being in a cutoff condition. However, when the beat note between the VCO's 14 and 14' is sufficiently low to indicate that secondary acquisition has been achieved, this beat frequency is allowed to pass from refraction signal line 82 through low-pass filter 96 and rectifier 98 to turn on the control transistor 94 and thereby complete the circuit for relay 74 to energize the relay 74.

The reason for this addition of resistors 72 and 72' into the lines 68 and 68' is as follows: It is desirable to provide a high-gain, wide-bandwidth loop for the slaving loop so that the two VCO's may be quickly locked together, even though they may initially possess several kiloHertz of frequency difference. This gain is provided by using a fairly low value of resistance for each of the resistors 70 and 70'. After the two VCO's have been locked together, the slaving loop gain is greatly reduced by the addition of the resistor 72 or 72' to the slaving loop, since these resistors 72 and 72' are relatively high value resistors. Although both resistors 72 and 72' are inserted simultaneously, the only effective one is the one in the slaving loop. After insertion of the high value resistor 72 or 72' into the slaving loop, there still is sufficient gain in the slaving loop to maintain the two VCO's in lock. In fact, with a presently preferred set of circuit component values, even with the resistor 72 or 72' in the slaving loop, the two VCO's will pull into lock from a frequency difference of over 40 Hz.

However, if an incoming RF signal is present on the unlocked channel phase-lock loop, and is above threshold level, its gain will be higher than the gain of the slaving loop and the slaving VCO will then lock to the incoming signal.

Assuming that primary acquisition is first achieved in channel A, the channel B slaving loop consists, generally, of the locked VCO 14 as a reference signal, the unlocked VCO 14', the balanced mixer 80 as a phase detector, the amplifier 64', a passive filter composed of resistor 70', resistor 22', and capacitor 26', and the active integrator 28'. Although this slaving loop is not an optimally designed loop, it is nevertheless adequate for the purpose since it operates with high, noise-free signals. Also, when the frequency of VCO 14' is being adjusted toward the frequency of VCO 14 during slaving, the resistor 72' is out of the circuit, so that the high gain provided by the relatively low value resistor 70' is effective.

Similarly, when primary acquisition is achieved in channel B, the slaving loop of channel A consists of the locked VCO 14' as a reference signal, the unlocked VCO 14, the balanced mixer 80 as a phase detector, the amplifier 64, a passive filter composed of resistor 70, resistor 22 and capacitor 26, and the active integrator 28 of the unlocked phase lock loop.

The manner in which the various relays cooperate to effect secondary acquisition will now be described in more detail. Assuming that slaving is desired, the slaving switch 88 will be closed, thereby making available through voltage supply line 90 the necessary voltage for energization of relay 58 or relay 58', and also for energization of relay 74. However, until primary acquisition is achieved in one of the channels, neither of the relays 58 or 58' can be energized, nor can the relay 74 be energized. As to relays 58 and 58', the coil of relay 58' is connected to the terminal 46, while the coil relay 58 is connected to terminal 46'. Until the primary acquisition circuit relay 44 of channel A is energized so as to ground the terminal 46, no current will flow through the relay 58', but upon energization of relay 44 with primary acquisition in channel A, the terminal 46 will be grounded and current will flow through the coil for relay 58' and energize the latter. Similarly, the coil for relay 58 is connected to terminal 46', which is normally open, but which is grounded when relay 44' of the primary acquisition circuit for channel B closes. Thus, relay 58 becomes energized upon primary acquisition in channel B.

Energization of relay 44 pursuant to primary acquisition in channel A, by grounding the terminal 46, causes the relay 48 to become energized; and similarly, energization of relay 44' upon primary acquisition in channel B causes terminal 46' to become grounded and thereby energizes the relay 48'.

Diodes D prevent the relays from operating due to sneak paths through the other relays.

Accordingly, until primary acquisition is achieved in one of the channels, all of the relays, 48, 48', 58, 58' and 74 will remain unenergized, which is the condition of operation of the relays as illustrated in the drawing.

In order to more fully define the manner in which the relays and other circuit components cooperate to effect secondary acquisition and to utilize that for the second primary acquisition, a typical operation of the circuit illustrated in the drawing will now be described.

The tuning potentiometer 54, which is generally operated as a front panel tuning control, but which may be automatically operated, tunes both VCO's to approximately the same frequency while hunting for a signal in either channel. Assume that channel A locks to a signal. This causes the relay 44 to ground terminal 46; resulting in energization of relay 48 and opening of contacts 50 thereof to disconnect the output of amplifier 64 from the channel A phase-lock loop 12. This now allows full control of the channel A phase-lock loop 12 by the incoming signal.

It is assumed that the receiver is in the slave mode, by virtue of the slaving switch 88 being closed, so that grounding of the terminal 46 causes energization of relay 58'. Contacts 62' of relay 58' connect one input of amplifier 64' to the refraction signal line 82 through conductor 86, while the other contacts 60' of relay 58' ground the other input of amplifier 64', whereby the amplifier 64' will function as a straight amplifier instead of as a differential amplifier. Thus, the beat signal between the two VCO's is fed to and amplified by the amplifier 64'. The operation of relay 48 also applies the plus-voltage supply to relay 74 through voltage supply line 90, relay contacts 52 and conductor 92, but relay 74 will not close if the beat note between the VCO's is higher than approximately 30 Hz.

The high gain of the slaving loop quickly pulls the channel B VCO 14' into phase-lock with the channel A VCO. Since the beat note from balanced mixer 80 has now disappeared, the control transistor 94 conducts and relay 74 operates so as to place resistor 72' in the slaving loop, reducing the gain of the slaving loop so that the normal channel B phase-lock loop 12' is free to lock to a signal if it is within the loop bandwidth, and above threshold level. When the channel B phase-lock loop 12' locks to the incoming RF signal, relay 44' operates so as to ground terminal 46' and cause relay 48' to be energized, contacts 50' thereof opening to disconnect amplifier 64' from the channel B phase-lock loop. Grounding of terminal 46' also causes energization of relay 58, changing the input of amplifier 64 to the refraction signal line 82 through conductor 86 and relay contacts 62. Relay contacts 60 will ground one input of amplifier 64 so that it functions as a straight amplifier. This leaves the circuit in a ready condition so that if either channel should lose lock with its incoming signal, the unlocked channel will immediately become slaved to the locked channel so as to bring the unlocked channel back into the locked condition Thus, if channel B should lose lock, as for example by reason of a fading RF signal, relay 48' will release, and consequently relay 58 will release, thereby immediately returning channel B to its slaving condition. Relay 74 will operate to keep resistor 72' in the slaving loop unless the beat note between the two VCO's exceeds approximately 30 Hz. If the beat note is less than approximately 40 Hz., the two VCO's will become phase-locked with the resistor 72' in the circuit. Thus, the VCO 14' will become slaved to VCO 14 until channel B again locks to a signal, and with resistor 72' in the slaving circuit, when the incoming channel B RF signal is above threshold level it will dominate over the slaving so that phase-lock loop 12' will lock to the incoming signal.

Similarly, if channel A should lose lock, relays 48 and 58' will release, slaving the VCO 14 of channel A to VCO 14' in channel B, and relay 74 will also operate to keep resistor 72 in the slaving loop unless the beat note between the two VCO's exceeds approximately 30 Hz. If the beat note is less than approximately 40 Hz., the VCO 14 of channel A will become phase-locked to VCO 14' of channel B, with resistor 72 in the circuit, and this slaving will continue until channel A again takes up the incoming RF signal and locks thereto.

In the foregoing detailed description of a typical slaving operation, it has been assumed that channel A is first to lock to an incoming RF signal, and that the channel B VCO 14' becomes slaved to the channel A VCO 14. Nevertheless, because of the general bilateral symmetry of the circuit illustrated in the drawing, it will be understood that where channel B first locks to an incoming signal, slaving of channel A to channel B will be similarly effected.

Accordingly, as soon as primary acquisition is achieved in either channel, the secondary acquisition circuit of the present invention holds the unacquired channel VCO at a frequency near where acquisition is expected. The second primary acquisition is then automatic. The net result is that the second acquisition will be accomplished in the fastest possible time, and normally much quicker than where manual hunting is required for the second acquisition. Thus, maximum reception time is also achieved. By the same token, minimum operator time and effort are required. Another important advantage of the present invention is to provide automatic reacquisition where one RF signal has faded and returned. By having two RF signals which are of widely differing frequencies, it is not uncommon for one of the RF signals to fade while the other RF signal remains above threshold level, so that one channel remains locked thereto and reacquisition of the other channel can be automatic.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent devices.

What is claimed is:

1. In a communication system, the combination comprising: first and second phase-lock loops, each loop including a superheterodyne receiver having a local oscillator input and having an output; a reference oscillator having an output signal of a constant frequency having an output; a phase detector having one input connected from said reference oscillator output and another input connected from said receiver output, said phase detector having an output; a variable frequency oscillator for providing an output signal in accordance with the magnitude of an input signal thereto, said variable frequency oscillator having an input and an output; first means connected from the output of said variable frequency oscillator to said receiver local oscillator input; second means connected from said phase detector output to said variable frequency oscillator input for changing the frequency of the output signal of said variable frequency oscillator in a direction tending to reduce the output signal of said phase detector to zero; and third means actuated to change the frequency of the output signal of said second loop variable frequency oscillator in accordance with the frequency of the output signal of said first loop variable frequency oscillator.

2. The invention as defined in claim 1, wherein said third means includes comparator means to produce an output signal in accordance with the difference between the output signal frequencies of said variable frequency oscillators, and sensitivity means to reduce the gain of said second loop drive means when said comparator means output signal falls below a predetermined threshold value.

3. In a communication system, the combination comprising: first and second phase-lock loops, each loop including a superheterodyne receiver having a local oscillator input and having an output; a reference oscillator having an output signal of a constant frequency having an output; a phase detector having one input connected from said reference oscillator output and another input connected from said receiver output, said phase detector having an output; a variable frequency oscillator for providing an output signal in accordance with the magnitude of an input signal thereto, said variable frequency oscillator having an input and an output; control means connected from the output of said variable frequency oscillator to said receiver local oscillator input; drive means connected from said phase detector output to said variable frequency oscillator input for changing the frequency of the output signal of said variable frequency oscillator in a direction tending to reduce the output signal of said phase detector to zero; first means for producing a first loop acquisition signal at the output thereof when the difference between the frequencies of the output signals of said first loop receiver and said first loop reference oscillator falls below a predetermined threshold level; second means for producing a second loop acquisition signal when the difference between the frequencies of the output signals of said second loop receiver and said second loop reference oscillator falls below a predetermined threshold level; comparator means to produce a slaving signal at the output thereof in accordance with the difference between the frequencies of the output signals of said variable frequency oscillators; first and second circuits for connecting the output of said comparator means to said first loop drive means and to said second loop drive means, respectively, said first circuit being actuable through said first loop drive means to change the output signal frequency of said first loop variable frequency oscillator in a direction to reduce the difference between the output signal frequencies of said variable frequency oscillators toward zero, said second circuit being actuable through said second loop drive means to change the output signal frequency of said second loop variable frequency oscillator in a direction to reduce the difference between the output signal frequencies of said variable frequency oscillators toward zero; variable means connected to both of said drive means to produce a tuning output signal for tuning said variable frequency oscillators; a first mode control actuable when said first loop acquisition signal is produced to interrupt said tuning signal to said first loop drive means, and to interrupt said tuning signal to said second loop drive means while passing said slaving signal thereto; a second mode control actuable when said second loop acquisition signal is produced to interrupt said tuning signal to said second loop drive means, and to interrupt said tuning signal to said first loop drive means while passing said slaving signal thereto, said first control, when actuated, interrupting the slaving signal provided by said second control to said first loop drive means, said second control, when actuated, interrupting said slaving signal provided by said first control to said second loop drive means.

4. In a communication system, the combination comprising: first and second phase-lock loops, each loop including a superheterodyne receiver having a local oscillator input and having an output; a reference oscillator having an output signal of a constant frequency having an output; a phase detector having one input connected from said receiver output, said phase detector having an output; a variable frequency oscillator for providing an output signal in accordance with the magnitude of an input signal thereto, said variable frequency oscillator having an input and an output; control means connected from the output of said variable frequency oscillator to said receiver local oscillator input; drive means connected from said phase detector output to said variable frequency oscillator input for changing the frequency of the output signal of said variable frequency oscillator in a direction tending to reduce the output signal of said phase detector to zero; first means for producing a first loop acquisition signal at the output thereof when the difference between the frequencies of the output signals of said first loop receiver and said first loop reference oscillator falls below a predetermined threshold level; second means for producing a second loop acquisition signal when the difference between the frequencies of the output signals of said second loop receiver and said second loop reference oscillator falls below a predetermined threshold level; comparator means to produce a slaving signal at the output thereof in accordance with the difference between the frequencies of the output signals of said variable frequency oscillators; a tuning control having an output; first and second slaving relays, each of said first and second slaving relays being adapted to operate at least one single-pole, double-throw switch, said switch including a movable pole, a normally closed contact, and a normally open contact, said tuning control output being connected to each slaving relay normally closed contact, said comparator means output being connected to each slaving relay normally open contact; and first and second override relays each having a pair of normally closed contacts connected in series between said first and second slaving relay poles, respectively, to said first and second loop drive means, respectively, said first means being adapted to energize said first override relay and said second slaving relay when said first loop acquisition signal is produced, said second means being adapted to energize said second override relay and said first slaving relay when said second loop acquisition signal is produced.

5. The invention as defined in claim 4, wherein each said control means includes a frequency multiplier.

6. The invention as defined in claim 4, wherein said comparator means includes a phase detector.

7. The invention as defined in claim 4, including gain control means responsive to the output of said comparator means for reducing the gain of said drive means when the difference between the frequencies of the output signals of said variable frequency oscillators falls below a predetermined threshold level.

8. The invention as defined in claim 7, wherein said gain control means includes resistors connected to said drive means, a control relay having normally closed contacts to shunt said resistors, and a low-pass filter and rectifier connected from said comparator means to energize said control relay.

9. The invention as defined in claim 1, wherein said third means includes comparator means to produce an output signal proportional to the difference between the frequencies of the output signals of said variable frequency oscillators, and means for impressing an input signal on said second loop drive means proportional to said comparator means output signal.

10. The invention as defined in claim 9, wherein said comparator means includes a phase detector.

11. The invention as defined in claim 1, wherein each said first means includes a frequency multiplier.